US012737866B2

(12) United States Patent
Kimura et al.

(10) Patent No.: US 12,737,866 B2
(45) Date of Patent: Sep. 15, 2026

(54) ROAD DETERIORATION DIAGNOSING DEVICE, ROAD DETERIORATION DIAGNOSING METHOD, AND RECORDING MEDIUM

(71) Applicant: NEC Corporation, Tokyo (JP)

(72) Inventors: Yosuke Kimura, Tokyo (JP); Nana Jumonji, Tokyo (JP); Chisato Sugawara, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 416 days.

(21) Appl. No.: 18/281,181

(22) PCT Filed: Mar. 15, 2021

(86) PCT No.: PCT/JP2021/010379

§ 371 (c)(1),
(2) Date: Sep. 8, 2023

(87) PCT Pub. No.: WO2022/195677

PCT Pub. Date: Sep. 22, 2022

(65) Prior Publication Data

US 2025/0029227 A1 Jan. 23, 2025

(51) Int. Cl.
*G06V 20/56* (2022.01)
*G06T 7/00* (2017.01)

(52) U.S. Cl.
CPC .......... *G06T 7/0004* (2013.01); *G06V 20/588* (2022.01)

(58) Field of Classification Search
CPC ..... G06T 7/0004; G06V 20/588; E01C 21/00; G01N 29/00
(Continued)

(56) References Cited

U.S. PATENT DOCUMENTS

2013/0173208 A1* 7/2013 Kuzunishi ................ G01B 5/28
73/104
2019/0162848 A1* 5/2019 Yuasa ..................... G01S 15/89
(Continued)

FOREIGN PATENT DOCUMENTS

JP 2007309832 A * 11/2007
JP 2013-139671 A 7/2013
(Continued)

OTHER PUBLICATIONS

International Search Report for PCT Application No. PCT/JP2021/010379, mailed on Jun. 8, 2021.
(Continued)

*Primary Examiner* — Vincent Rudolph

(57) ABSTRACT

A road deterioration diagnosing device includes a deterioration detection unit, a road surface condition detection unit, and a reliability determination unit. The deterioration detection unit detects road deterioration based on an image and/or acceleration acquired by a moving body. The road surface condition detection unit detects, based on a sound acquired together with the image and/or acceleration used for detecting the road deterioration, a road surface condition at the time of acquiring the sound. The reliability determination unit acquires the reliability of the detection result of the road deterioration based on the road surface condition detected.

12 Claims, 14 Drawing Sheets

(58) Field of Classification Search
USPC .................................................. 382/100, 149
See application file for complete search history.

(56) References Cited

U.S. PATENT DOCUMENTS

| | | | | |
|---|---|---|---|---|
| 2020/0139976 | A1 | 5/2020 | Magnusson et al. | |
| 2020/0156646 | A1* | 5/2020 | Umemura ........... | B60W 40/105 |

FOREIGN PATENT DOCUMENTS

| | | | |
|---|---|---|---|
| JP | 2014-153903 | A | 8/2014 |
| JP | 2019-175020 | A | 10/2019 |
| JP | 2020-056303 | A | 4/2020 |
| JP | 2021-026353 | A | 2/2021 |
| WO | 2018/066117 | A1 | 4/2018 |

OTHER PUBLICATIONS

English translation of Written opinion for PCT Application No. PCT/JP2021/010379, mailed on Jun. 8, 2021.

* cited by examiner

10 ROAD DETERIORATION DIAGNOSING SYSTEM
30 DISPLAY DEVICE
20 ROAD DETERIORATION DIAGNOSING DEVICE
40_N
40_2
40_1

Fig.3

SENSOR INFORMATION

| VEHICLE ID | DATE AND TIME | LOCATION | IMAGE | ACCELERATION | TRAVELING SOUND |
|---|---|---|---|---|---|
| Car01 | T0001 | L0001 | P0001 | A0001 | S0001 |
| Car01 | T0002 | L0002 | P0002 | A0002 | S0002 |
| ... | ... | ... | ... | ... | ... |
| Car01 | T0101 | L0101 | P0101 | A0101 | S0101 |
| Car01 | T0102 | L0102 | P0102 | A0102 | S0102 |
| ... | ... | ... | ... | ... | ... |
| Car02 | T0201 | L0001 | P0201 | A0201 | S0201 |
| Car02 | T0201 | L0002 | P0202 | A0202 | S0202 |
| ... | ... | ... | ... | ... | ... |

Fig.4

DETERIORATION INFORMATION

| VEHICLE ID | DATE AND TIME | LOCATION | ROAD SURFACE CONDITION | IMAGE-BASED DETERIORATION INDEX | | RELIABILITY (IMAGE) | ACCELERATION-BASED DETERIORATION INDEX | | RELIABILITY (ACCELERATION) | INTEGRATED DETERIORATION INDEX | RELIABILITY (INTEGRATION) |
|---|---|---|---|---|---|---|---|---|---|---|---|
| | | | | CRACKING RATE | RUTTING AMOUNT | | FLATNESS | IRI VALUE | | MCI VALUE | |
| Car01 | T0001 | L0001 | DRY | 23 | 15.4 | HIGH | 5.95 | 8.15 | HIGH | 3.5 | HIGH |
| Car01 | T0002 | L0002 | DRY | 21.8 | 8.4 | HIGH | 4.41 | 6.11 | HIGH | 4.4 | HIGH |
| ... | ... | ... | ... | ... | ... | ... | ... | ... | ... | ... | ... |
| Car01 | T0101 | L0101 | SLIGHTLY WET | 10.2 | 7.5 | MEDIUM | 3.71 | 7.15 | HIGH | 4 | MEDIUM |
| Car01 | T0102 | L0102 | SLIGHTLY WET | 9.4 | 5.3 | MEDIUM | 4.75 | 6.69 | HIGH | 3.1 | MEDIUM |
| ... | ... | ... | ... | ... | ... | ... | ... | ... | ... | ... | ... |
| Car02 | T0201 | L0001 | VERY WET | 2.6 | 3.5 | LOW | 5.56 | 7.86 | HIGH | 3.5 | LOW |
| Car02 | T0201 | L0002 | VERY WET | 1.5 | 2.7 | LOW | 4.1 | 5.61 | HIGH | 4.4 | LOW |
| ... | ... | ... | ... | ... | ... | ... | ... | ... | ... | ... | ... |

Fig.6

RELIABILITY TABLE

| ROAD SURFACE CONDITION | RELIABILITY (IMAGE) | RELIABILITY (ACCELERATION) |
|---|---|---|
| DRY | HIGH | HIGH |
| SLIGHTLY WET | MEDIUM | HIGH |
| VERY WET | LOW | HIGH |
| SNOW | LOW | LOW |
| FREEZE | LOW | LOW |
| MANHOLE | LOW | LOW |
| JOINT | LOW | LOW |

EVALUATION TARGET TABLE

| ROAD SURFACE CONDITION | DETERIORATION EVALUATION TARGET (IMAGE) | DETERIORATION EVALUATION TARGET (ACCELERATION) |
|---|---|---|
| DRY | USE | USE |
| SLIGHTLY WET | USE | USE |
| VERY WET | NOT USE | USE |
| SNOW | NOT USE | NOT USE |
| FREEZE | NOT USE | NOT USE |
| MANHOLE | NOT USE | NOT USE |
| JOINT | NOT USE | NOT USE |

Fig.10

ROAD DETERIORATION DETECTION TARGET DISCRIMINATION RESULT

| VEHICLE ID | DATE AND TIME | LOCATION | IMAGE | ACCELERATION | TRAVELING SOUND | ROAD SURFACE CONDITION | EVALUATION TARGET (IMAGE) | EVALUATION TARGET (ACCELERATION) |
|---|---|---|---|---|---|---|---|---|
| Car01 | T0001 | L0001 | P0001 | A0001 | S0001 | DRY | USE | USE |
| Car01 | T0002 | L0002 | P0002 | A0002 | S0002 | DRY | USE | USE |
| ... | ... | ... | ... | ... | ... | ... | ... | ... |
| Car01 | T0101 | L0101 | P0101 | A0101 | S0101 | SLIGHTLY WET | USE | USE |
| Car01 | T0102 | L0102 | P0102 | A0102 | S0102 | SLIGHTLY WET | USE | USE |
| ... | ... | ... | ... | ... | ... | ... | ... | ... |
| Car02 | T0201 | L0001 | P0201 | A0201 | S0201 | VERY WET | NOT USE | USE |
| Car02 | T0201 | L0002 | P0202 | A0202 | S0202 | VERY WET | NOT USE | USE |
| ... | ... | ... | ... | ... | ... | ... | ... | ... |

Fig.11

DETERIORATION INFORMATION

| VEHICLE ID | DATE AND TIME | LOCATION | ROAD SURFACE CONDITION | IMAGE-BASED DETERIORATION INDEX | | RELIABILITY (IMAGE) | ACCELERATION-BASED DETERIORATION INDEX | | RELIABILITY (ACCELERATION) | INTEGRATED DETERIORATION INDEX | RELIABILITY (INTEGRATION) |
|---|---|---|---|---|---|---|---|---|---|---|---|
| | | | | CRACKING RATE | RUTTING AMOUNT | | FLATNESS | IRI VALUE | | MCI VALUE | |
| Car01 | T0001 | L0001 | DRY | 23 | 15.4 | HIGH | 5.95 | 8.15 | HIGH | 3.5 | HIGH |
| Car01 | T0002 | L0002 | DRY | 21.8 | 8.4 | HIGH | 4.41 | 6.11 | HIGH | 4.4 | HIGH |
| ... | ... | ... | ... | ... | ... | ... | ... | ... | ... | ... | ... |
| Car01 | T0101 | L0101 | SLIGHTLY WET | 10.2 | 7.5 | MEDIUM | 3.71 | 7.15 | HIGH | 4 | MEDIUM |
| Car01 | T0102 | L0102 | SLIGHTLY WET | 9.4 | 5.3 | MEDIUM | 4.75 | 6.69 | HIGH | 3.1 | MEDIUM |
| ... | ... | ... | ... | ... | ... | ... | ... | ... | ... | ... | ... |
| Car02 | T0201 | L0001 | VERY WET | — | — | LOW | 5.56 | 7.86 | HIGH | — | LOW |
| Car02 | T0201 | L0002 | VERY WET | — | — | LOW | 4.1 | 5.61 | HIGH | — | LOW |
| ... | ... | ... | ... | ... | ... | ... | ... | ... | ... | ... | ... |

Fig.12

500
507
DRIVE DEVICE
501
CPU
502
ROM
503
RAM
509
INPUT DEVICE
510
OUTPUT DEVICE
512
STORAGE DEVICE
PROGRAM
504
505
COMMUNICATION INTERFACE
508
INPUT/OUTPUT INTERFACE
511
PERIPHERAL DEVICE
COMMUNICATION NETWORK
506
RECORDING MEDIUM

ROAD DETERIORATION DIAGNOSING DEVICE, ROAD DETERIORATION DIAGNOSING METHOD, AND RECORDING MEDIUM

This application is a National Stage Entry of PCT/JP2021/010379 filed on Mar. 15, 2021, the contents of all of which are incorporated herein by reference, in their entirety.

TECHNICAL FIELD

The present disclosure relates to a road deterioration diagnosing device, a road deterioration diagnosing method, and a recording medium.

BACKGROUND ART

A system that detects road deterioration by analyzing images and accelerations collected by vehicles is known.

For example, PTL 1 discloses that, for example, a speed of a vehicle, an acceleration of the vehicle, a traveling sound, a road surface shape, an outside air temperature, a friction coefficient of the road surface, a rainfall amount, a road surface temperature, and the like are used as measurement information regarding a road. In addition, PTL 2 discloses a technique for detecting abnormality of a road based on sensing data such as speed data, location data, and sound data.

CITATION LIST

Patent Literature

PTL 1: JP 2014-153903 A
PTL 2: JP 2013-139671 A

SUMMARY OF INVENTION

Technical Problem

In road deterioration detection by image analysis or acceleration analysis described above, a detection result with sufficient accuracy may not be obtained due to the influence of weather, an artifact on a road, or the like. For example, in the calculation of the cracking rate by image analysis, in the case of rain, when there is a puddle or the like on the road surface, the accuracy of the value of the cracking rate is lowered. Also in road deterioration detection by acceleration analysis, for example, in calculation of an international roughness index (IRI), since an acceleration at the time of passing through a manhole is affected by the manhole, the accuracy of the IRI value is lowered.

As described above, since a detection result of road deterioration based on an image or acceleration is affected by weather, an artifact on a road, or the like, it is desirable to provide reliability of the detection result considering the influence when presenting the detection result.

However, in the techniques disclosed in PTL 1 and PTL 2, reliability of detection of road deterioration is not considered.

An object of the present disclosure is to provide a road deterioration detection device, a road deterioration detection method, and a recording medium capable of solving the above-described problems and providing reliability of a detection result in the road deterioration detection based on an image and acceleration.

Solution to Problem

A road deterioration diagnosing device according to one aspect of the present disclosure includes a deterioration detection means that detects road deterioration based on at least one of an image and acceleration acquired by a moving body, a road surface condition detection means that detects, based on a sound acquired together with at least one of the image and acceleration used in the road deterioration detection, a road surface condition at the time when the sound is acquired and a reliability determination means that determines reliability of the road deterioration detection result based on the detected road surface condition.

A road deterioration diagnosing method according to an aspect of the present disclosure includes detecting road deterioration based on at least one of an image and acceleration acquired from a moving body, detecting, based on a sound acquired together with at least one of the image and acceleration used in the road deterioration detection, road surface condition at the time when the sound is acquired, and determining reliability of the road deterioration detection result based on the detected road surface condition.

A recording medium according to one aspect of the present disclosure is a recording medium storing a program that causes a computer to execute processing including detecting road deterioration based on at least one of an image and acceleration acquired from a moving body, detecting, based on a sound acquired together with at least one of the image and acceleration used in the road deterioration detection, road surface condition at the time when the sound is acquired, and determining reliability of the road deterioration detection result based on the detected road surface condition.

Advantageous Effects of Invention

An effect of the present disclosure is that reliability of a detection result can be provided in road deterioration detection based on an image or acceleration.

BRIEF DESCRIPTION OF DRAWINGS

FIG. 3 is a diagram illustrating an example of sensor information according to the first example embodiment.

FIG. 4 is a diagram illustrating an example of deterioration information according to the first example embodiment.

FIG. 6 is a diagram illustrating an example of a reliability table according to the first example embodiment.

FIG. 7 is a diagram illustrating an example of display of deterioration information according to the first example embodiment.

FIG. 9 is a diagram illustrating an example of a detection target table according to the second example embodiment.

FIG. 10 is a diagram illustrating an example of a discrimination result of a road deterioration detection target according to the second example embodiment.

FIG. 11 is a diagram illustrating an example of deterioration information according to the second example embodiment.

FIG. 12 is a diagram illustrating an example of display of deterioration information according to the second example embodiment.

EXAMPLE EMBODIMENT

First Example Embodiment

A first example embodiment will be described.

(System Configuration)

Figure 1:
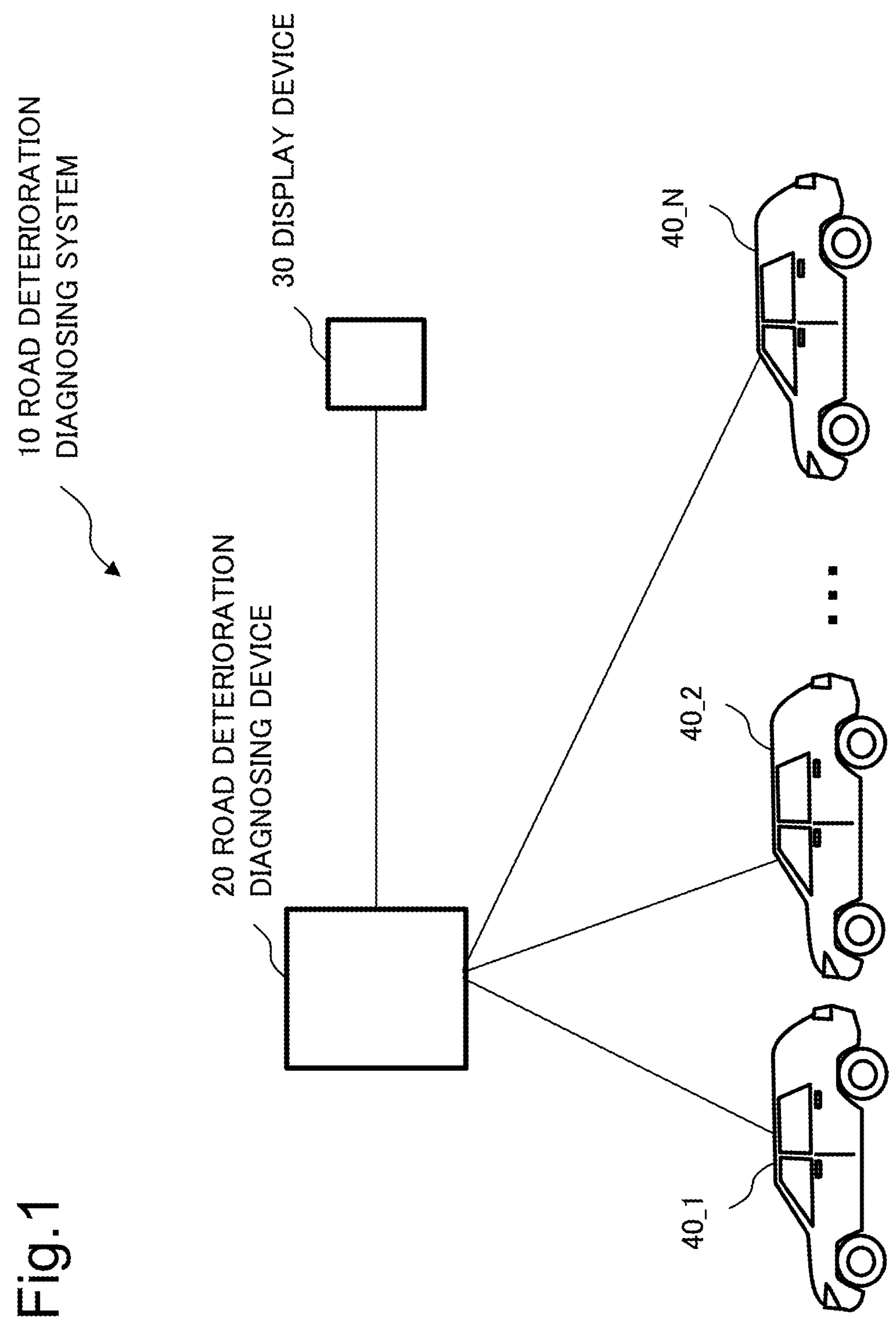
FIG. 1 is a block diagram illustrating a configuration of a road deterioration diagnosing system 10 according to a first example embodiment.

First, a configuration of a road deterioration diagnosing system according to the first example embodiment will be described. FIG. 1 is a block diagram illustrating a configuration of a road deterioration diagnosing system 10 according to the first example embodiment. Referring to FIG. 1, the road deterioration diagnosing system 10 includes a road deterioration diagnosing device 20, a display device 30, and a plurality of vehicles 401, 40_2, . . . 40_N (N is a natural number) (hereinafter, collectively referred to as a vehicle 40) that are moving bodies. Examples of the vehicle include an automobile (four-wheeled automobile), a motorcycle, a bicycle, and the like.

The vehicle 40 captures (acquires) an image of a road (road surface) while traveling on the road by an imaging device such as a camera of a drive recorder. While traveling on the road, the vehicle 40 detects (acquires) unevenness of a road surface of the road as acceleration (vibration in the vertical direction) by the acceleration sensor. Furthermore, the vehicle 40 acquires sound with a small microphone or the like while traveling on the road. The small microphone is installed, for example, in a location where wind noise can be suppressed, such as in a front fender (wheel housing) of the vehicle 40. The traveling sound that is a sound generated when the vehicle travels is an example of the sound to be acquired. Hereinafter, in the present example embodiment, a sound acquired by a small microphone or the like of the vehicle 40 will be described as a traveling sound.

The vehicle 40 acquires the image, the acceleration, and the location at the time of acquiring the traveling sound by a location detection sensor such as a global positioning system (GPS). The vehicle 40 transmits sensor information including a vehicle identifier (ID), date and time, a location, and an image, acceleration, and a traveling sound acquired at the date and time and the location to the road deterioration diagnosing device 20. Here, the acceleration may be, for example, a time series of accelerations acquired for a predetermined time before and after the time of the sensor information or for a predetermined distance before and after the location. Similarly, the traveling sound may be, for example, a time series of traveling sounds acquired for a predetermined time before and after the time of the sensor information or for a predetermined distance before and after the location.

The road deterioration diagnosing device 20 detects road deterioration based on at least one of the image and acceleration included in sensor information transmitted from the vehicle 40. The road deterioration diagnosing device 20 detects the road surface condition based on the traveling sound, and calculates the reliability of the detection result of the road deterioration based on the detected road surface condition. The road deterioration diagnosing device 20 causes the display device 30 to display a detection result and reliability of road deterioration.

The road deterioration diagnosing device 20 and the display device 30 are disposed, for example, in an equipment management facility of a company. The road deterioration diagnosing device 20 and the display device 30 may be integrated or separate. The road deterioration diagnosing device 20 may be disposed in a place other than the equipment management facility of the company. In this case, the road deterioration diagnosing device 20 may be achieved by a cloud computing system.

As a method for detecting road deterioration based on sensor information, a known technique using image analysis or acceleration analysis is used. Examples of detection using image analysis include a method of analyzing road deterioration using artificial intelligence (AI). Examples of detection using acceleration analysis include a method of detecting the degree of unevenness of a road surface using acceleration in a direction perpendicular to the road surface. Examples of a method of detecting the road surface condition based on the traveling sound include a method of detecting the road surface condition using the sound pressure or the frequency of the traveling sound.

Figure 2:
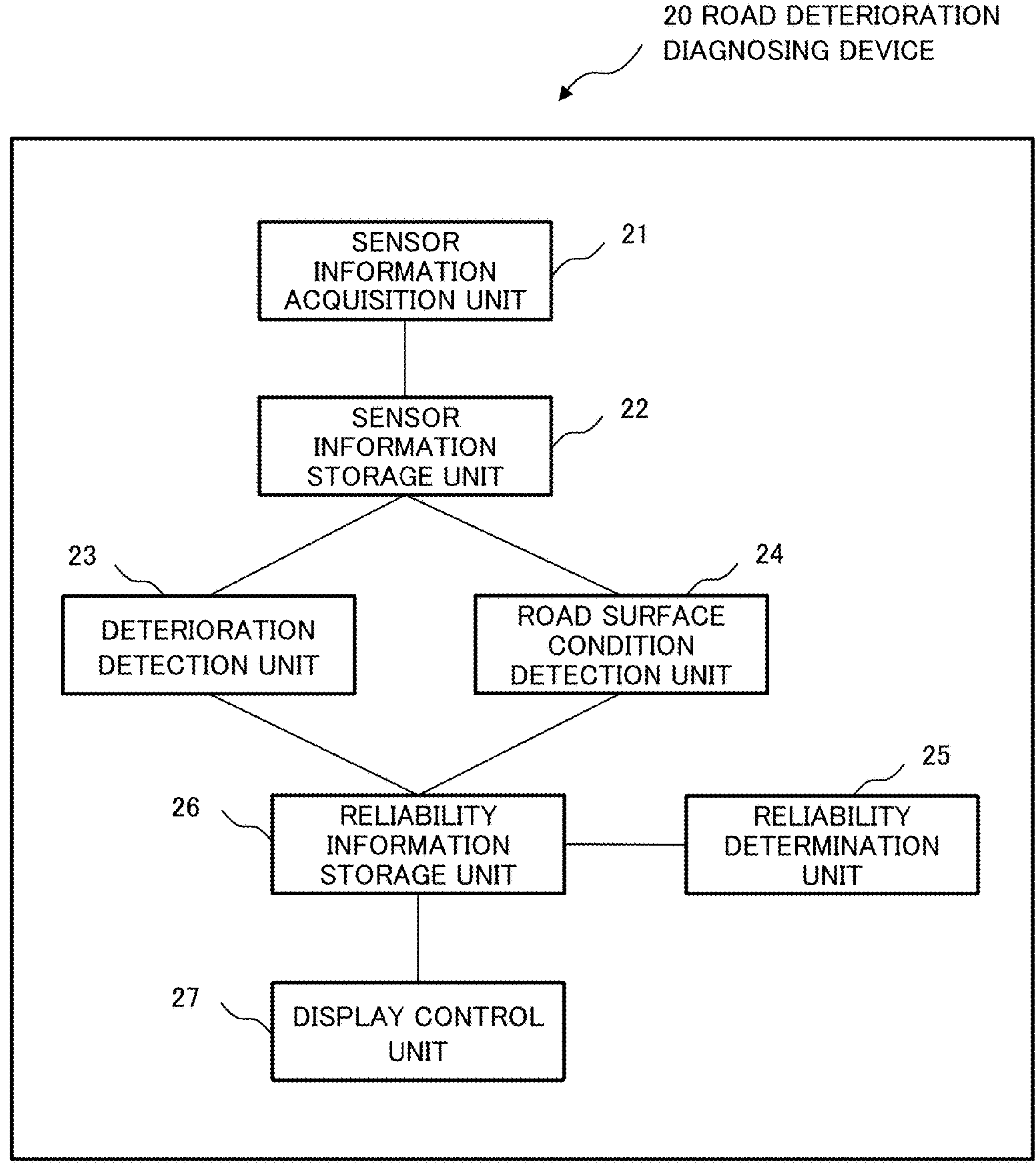
FIG. 2 is a block diagram illustrating an example of a configuration of a road deterioration diagnosing device 20 according to the first example embodiment.

FIG. 2 is a block diagram illustrating an example of a configuration of a road deterioration diagnosing device 20 according to the first example embodiment. As illustrated in FIG. 2, the road deterioration diagnosing device 20 includes a sensor information acquisition unit 21, a sensor information storage unit 22, a deterioration detection unit 23, a road surface condition detection unit 24, a reliability determination unit 25, a deterioration information storage unit 26, and a display control unit 27.

The sensor information acquisition unit 21 acquires sensor information from the vehicle 40. The sensor information acquisition unit 21 outputs the acquired sensor information to the sensor information storage unit 22.

The sensor information storage unit 22 stores the sensor information output by the sensor information acquisition unit 21.

FIG. 3 is a diagram illustrating an example of sensor information according to the first example embodiment. The example of the sensor information illustrated in FIG. 3 includes information related to a vehicle ID for identifying the vehicle 40 that is the transmission source of the sensor information, date and time, location, image, acceleration, and traveling sound. The date and time indicates the date and time when the vehicle 40 acquired the image, the acceleration, and the traveling sound. The location indicates a location where the image and the acceleration are acquired.

FIG. 3 illustrates, for example, that the date and time "T0001" and "T0002" of the vehicle ID "Car01" and the date and time "T0201" and "T0202" of the vehicle ID "Car02" are sensor information acquired from different vehicles 40 at the same place in different time zones (or different days).

The deterioration detection unit 23 detects road deterioration (calculates a value of an index indicating a degree of road deterioration) based on at least one of an image and acceleration included in sensor information acquired by the vehicle 40 that is a moving body. The deterioration detection unit 23 stores a detection result of road deterioration in the deterioration information storage unit 26 as deterioration information.

FIG. 4 is a diagram illustrating an example of deterioration information according to the first example embodiment.

In the example of FIG. 4, the deterioration information includes the detection result of the road surface condition, the detection result of the road deterioration (the calculation result of the deterioration index), and the reliability of the detection result of the road deterioration.

The road surface condition detection unit 24 detects the road surface condition at the time of acquisition of the sensor information (at the time of acquisition of the traveling sound) based on the traveling sound included in the sensor information. The road surface condition detection unit 24 may set the road surface condition in association with the detection result of the road deterioration in the deterioration information.

The reliability determination unit 25 determines reliability of the detection result of road deterioration based on the detected road surface condition. The reliability determination unit 25 sets the reliability in association with the detection result of road deterioration in the deterioration information. A method of determining the reliability will be described later.

The deterioration information storage unit 26 stores the deterioration information.

The display control unit 27 causes, for example, the display device to display the deterioration information in a predetermined display mode.

Next, an operation of the first example embodiment will be described.

(Reliability Determination Process)

The reliability determination process will be described. The reliability determination process is a process of detecting road deterioration based on at least one of an image and acceleration included in sensor information transmitted from each vehicle 40, detecting a road surface condition based on a traveling sound included in the sensor information, and determining reliability for detection of road deterioration based on the road surface condition.

Figure 5:
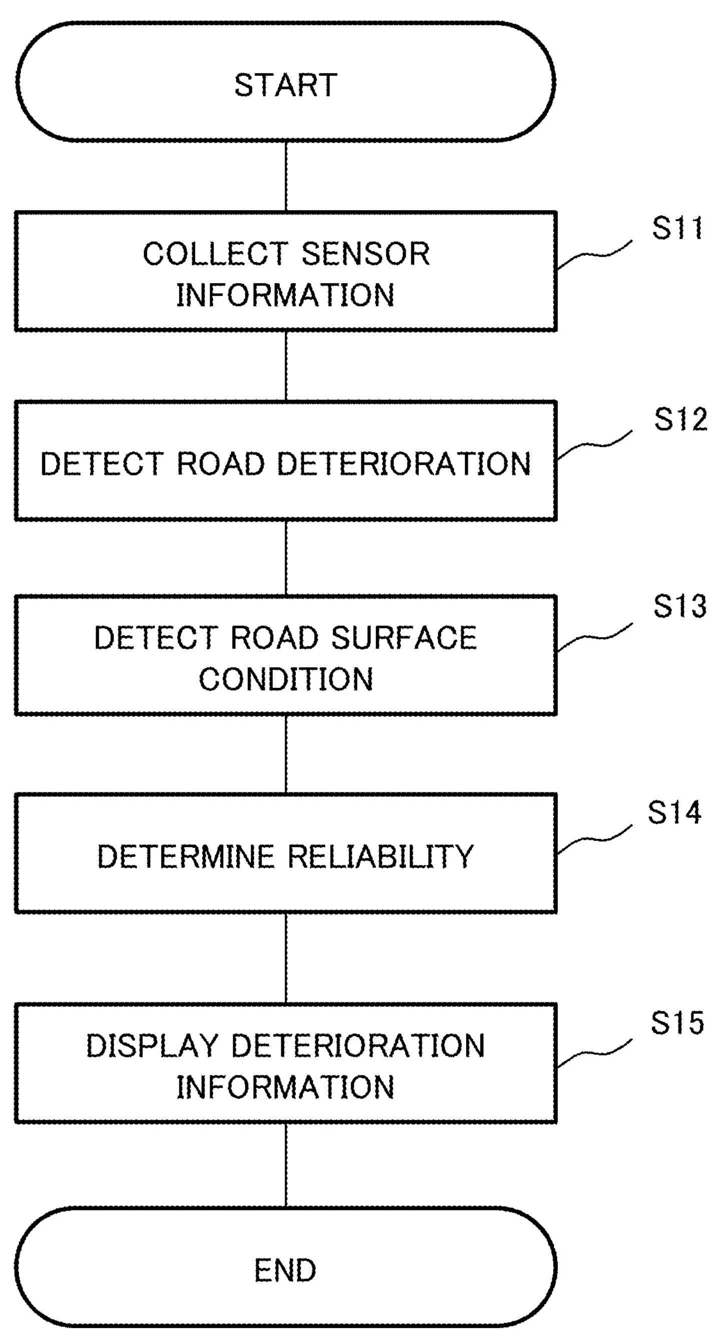
FIG. 5 is a flowchart illustrating a reliability determination process according to the first example embodiment.

FIG. 5 is a flowchart illustrating the reliability determination process according to the first example embodiment.

In the road deterioration diagnosing system 10, the sensor information acquisition unit 21 of the road deterioration diagnosing device 20 acquires sensor information (for example, the vehicle ID, date and time, location, image, acceleration, and traveling sound) transmitted from the vehicle 40 (step S11). For example, the sensor information acquisition unit 21 acquires sensor information as illustrated in FIG. 3. The sensor information acquisition unit 21 stores the acquired sensor information in the sensor information storage unit 22.

The deterioration detection unit 23 detects road deterioration based on at least one of the image and acceleration included in each piece of sensor information (step S12). The deterioration detection unit 23 stores a detection result of road deterioration in the deterioration information storage unit 26 as deterioration information. Here, the deterioration detection unit 23 calculates a value of an index indicating the degree of road deterioration by a known method as described above. For example, the deterioration detection unit 23 calculates a cracking rate and a rutting amount based on the image. The deterioration detection unit 23 calculates flatness and an international roughness index (IRI) value based on the acceleration, for example. The deterioration detection unit 23 calculates a maintenance control index (MCI) value which is an index obtained by integrating the cracking rate, the rutting amount, and the flatness which are calculated. For example, the deterioration detection unit 23 detects road deterioration (calculates a value of each index) as illustrated in FIG. 4 based on the sensor information of FIG. 3.

The road surface condition detection unit 24 detects the road surface condition at the time of acquiring the sensor information based on the traveling sound included in each sensor information (step S13). The road surface condition detection unit 24 sets the detected road surface condition as the deterioration information. The road surface condition detection unit 24 detects the road surface condition by analyzing the sound pressure and frequency of the traveling sound. The road surface condition detection unit 24 detects the road surface condition based on the traveling sound by learning in advance the characteristic frequency, sound pressure, and the like of the traveling sound caused by the difference in the road surface condition. The road surface condition detection unit 24 detects, as the road surface condition, a state caused by the weather (dry (not rain, snow, or the like), slightly wet (with light rain and no puddles), very wet (with puddles), snow, freeze) and presence of an artifact (a manhole, a joint, etc.). For example, the deterioration detection unit 23 detects the road surface condition as illustrated in FIG. 4 based on the sensor information of FIG. 3.

The reliability determination unit 25 determines reliability of a detection result of road deterioration based on each piece of sensor information referring to the road surface condition detected in step S13 (step S14). The reliability determination unit 25 sets the determined reliability to the deterioration information. Here, the reliability determination unit 25 determines the reliability, for example, based on a reliability table. The reliability table is a table indicating a relationship between a road surface condition and reliability of a detection result of road deterioration in the road surface condition. The reliability table is stored in advance in a reliability table storage unit (not illustrated) or the like by an administrator or the like.

FIG. 6 is a diagram illustrating an example of the reliability table according to the first example embodiment. As illustrated in FIG. 6, the reliability is divided into the reliability with respect to the detection result of the road deterioration based on the image (hereinafter, also described as reliability (image)) and the reliability with respect to the detection result of the road deterioration based on the acceleration (hereinafter, also described as reliability (acceleration)). This is because a difference in reliability occurs between a detection result of road deterioration based on an image and a detection result of road deterioration based on acceleration due to a difference in road surface condition caused by the weather or the like.

For example, in a case where the road surface condition is slightly wet with water (with light rain and no puddles), the road surface becomes dark due to wetting of the road surface, and it becomes difficult for the deterioration detection unit 23 to distinguish between the road surface based on the image and the crack, for example. On the other hand, in the detection of the unevenness of the road surface based on the acceleration, the deterioration detection unit 23 can detect the unevenness without being affected by the change in the road surface due to the light rain. Therefore, in the example of FIG. 6, in a case where the road surface condition is slightly wet, the reliability (image) is "medium", and the reliability (acceleration) is "high".

When the road surface condition is very wet (with puddles), puddles are formed in cracks on the road surface, and the deterioration detection unit 23 cannot detect the cracks based on, for example, the image. On the other hand, in the detection of the unevenness of the road surface based on the acceleration, the deterioration detection unit 23 can detect the unevenness without being affected by the puddles or the like. Therefore, in the example of FIG. 6, when the road surface condition is very wet, the reliability (image) is "low" and the reliability (acceleration) is "high".

In the example of FIG. 6, the reliability (image) and the reliability (acceleration) are the same except for the case of slightly wet and very wet.

In the reliability table, the road surface condition with the "medium" or "low" reliability is also referred to as a first condition.

The reliability determination unit 25 evaluates the reliability (image) related to the detected road surface condition in a detection result (for example, a cracking rate and a rutting amount) of the road deterioration based on the image. The reliability determination unit 25 evaluates the reliability (acceleration) related to the detected road surface condition in the detection result (for example, flatness, IRI) of the road deterioration based on the acceleration. Further, the reliability determination unit 25 may apply the reliability (hereinafter, also described as reliability (integrated)) determined by a predetermined rule based on the reliability (image) and the reliability (acceleration) as an integrated index calculated from the detection result of the road deterioration based on the image and the detection result of the road deterioration based on the acceleration as in the MCI. In this case, for example, the reliability determination unit 25 may set the lower reliability of the reliability (image) and the reliability (acceleration) as the reliability (integrated).

For example, the reliability determination unit 25 determines the reliability as illustrated in FIG. 4 using the reliability table of FIG. 6. More specifically, since the road surface condition is "dry" at the dates and times "T0001" and "T0002", the reliability determination unit 25 refers to the reliability table in FIG. 6 and evaluates the reliability (image) related to the cracking rate and the rutting amount as "high", the reliability (acceleration) related to the flatness and IRI as "high", and the reliability (integration) related to the MCI as "high". At the dates and times "T0101" and "T0102", the road surface condition is "slightly wet", and thus the reliability determination unit 25 refers to the reliability table in FIG. 6 and evaluates the reliability (image) related to the cracking rate and the rutting amount as "medium", the reliability (acceleration) related to the flatness and IRI as "high", and the reliability (integration) related to the MCI as "medium". In the dates and times "T0201" and "T0202", the sensor information is acquired at the same locations as the dates and times "T0001" and "T0002", but the road surface condition is "very wet" that is different. In the dates and times "T0201" and "T0202", the reliability determination unit 25 evaluates the reliability (image) related to the cracking rate and the rutting amount as "low", the reliability (acceleration) related to the flatness and IRI as "high", and the reliability (integrated) related to MCI as "low".

The display control unit 27 causes, for example, the display device 30 to display the deterioration information in a predetermined display mode (step S15). Here, the display control unit 27 displays the detection result of road deterioration included in the deterioration information together with the reliability of the detection result.

Figure 7:
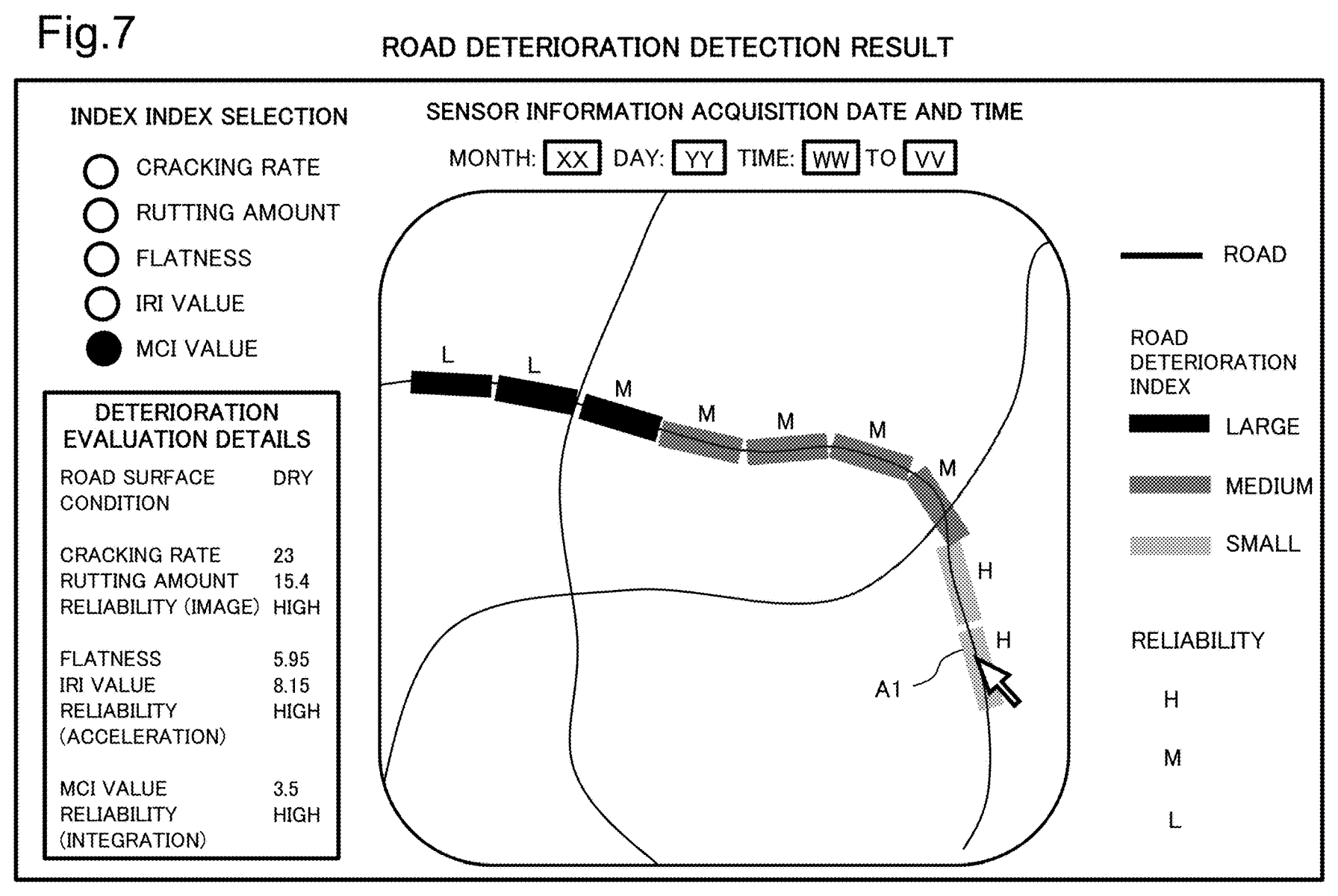

FIG. 7 is a diagram illustrating an example of display of deterioration information according to the first example embodiment. For example, the display control unit 27 displays the detection result (index value) and the reliability of the date and time designated by the user for each road section on the road map. Here, for example, the display control unit 27 displays the index value selected by the user from among the calculated indexes in a display mode of a level according to the value. The display control unit 27 displays the reliability of the selected index in a display mode of the reliability.

In the example of FIG. 7, the MCI is selected as an index, and for each road section, levels "large", "medium", and "small" according to the value of the MCI are displayed in rectangles of different shades. In the example of FIG. 7, for each road section, the reliability (integration) "high", "medium", and "low" related to the MCI are displayed by symbols "H", "M", and "L", respectively.

Furthermore, in a case where the displayed rectangle is clicked, tapped, or put a mouse over thereon, the display control unit 27 may display the road surface condition at the location represented by the rectangle, the value of each index, and the reliability. For example, in the example of FIG. 7, when the rectangle A1 is clicked, tapped, or put a mouse over thereon, the road surface condition at the location represented by the rectangle A1, the value of each index, and the reliability are displayed in "Deterioration Detection Details".

With the above configuration, the operation according to the first example embodiment is completed.

In the above description, the process of detecting road deterioration in step S12 and the process of detecting a road surface condition in step S13 are performed first. However, step S13 may be performed first. Although rectangles are used as a display mode of the detection results of the road deterioration, the display mode is not limited thereto, and the detection results of the road deterioration may be displayed in another display mode such as arrows. Furthermore, the detection results of the road deterioration are represented by shading, and the reliability thereof are represented by symbols. However, the present invention is not limited thereto, and the detection results of the road deterioration may be represented by differences in color, and the reliability thereof may be represented by shading.

Effects of First Example Embodiment

According to the first example embodiment, reliability of detection results can be provided in road deterioration detection using an image or acceleration. This is because the deterioration detection unit 23 detects the road deterioration based on at least one of the image and the acceleration acquired by the vehicle 40, the road surface condition detection unit 24 detects the road surface condition at the time of acquisition of the sound based on the sound acquired together with at least one of the image and the acceleration used to detect the road deterioration, and the reliability determination unit 25 determines the reliability of the detection result of the road deterioration based on the detected road surface condition.

Second Example Embodiment

A second example embodiment will be described. In the second example embodiment, the road deterioration diagnosing device 20 does not detect road deterioration using an image or acceleration with low reliability. The configuration of the road deterioration diagnosing device 20 according to the second example embodiment is similar to the configuration of the road deterioration diagnosing device 20 according to the first example embodiment. However, in the road deterioration diagnosing device 20 according to the second example embodiment, the operation of the deterioration detection unit 23 is different from that of the first example embodiment in order not to detect road deterioration using an image or acceleration with low reliability. According to the second example embodiment, only portions different from those of the first example embodiment will be described.

In the road deterioration diagnosing device 20 according to the second example embodiment, when the road surface condition detected based on the traveling sound by the road surface condition detection unit 24 is a predetermined condition (a second condition to be described later), the deterioration detection unit 23 excludes, from the road deterioration detection target, at least one of the image and the acceleration acquired together with the traveling sound.

Next, an operation of the second example embodiment will be described.

(Reliability Determination Process)

Figure 8:
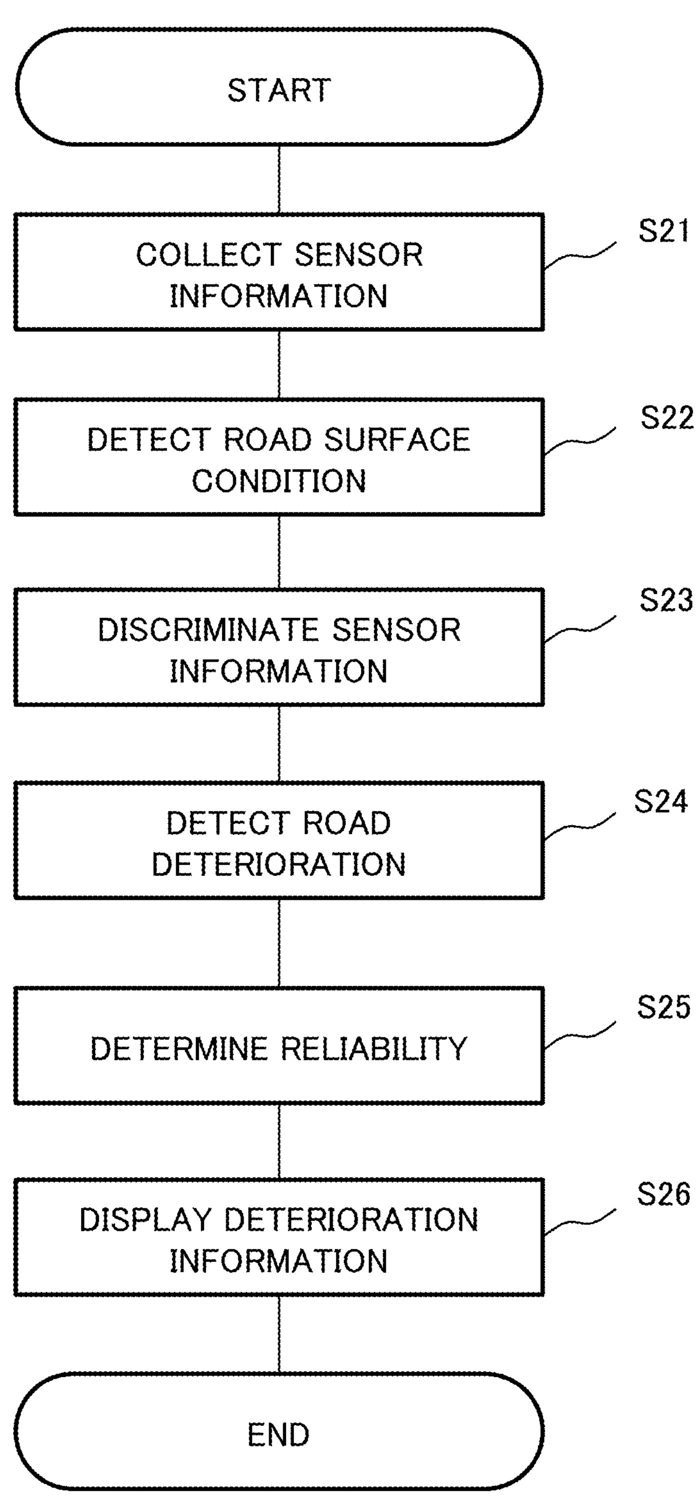
FIG. 8 is a flowchart illustrating a reliability determination process according to a second example embodiment.

FIG. 8 is a flowchart illustrating the reliability determination process according to the second example embodiment.

First, the sensor information acquisition unit 21 acquires sensor information (for example, vehicle ID, date and time, location, image, acceleration, and traveling sound) transmitted from the vehicle 40 (step S21).

The road surface condition detection unit 24 detects the road surface condition at the time of acquiring the sensor information based on the traveling sound included in each sensor information (step S22).

Based on the road surface condition detected in step S22, the deterioration detection unit 23 discriminates whether at least one of the image and the acceleration included in the sensor information is a road deterioration detection target (step S23). Here, for example, the deterioration detection unit 23 determines whether to exclude the information from the road deterioration detection target based on a detection target table. The detection target table is a table indicating a road surface condition and whether an image or acceleration included in the sensor information in the road surface condition is a road deterioration detection target (use/not use). The detection target table is stored in advance in a detection target table storage unit (not illustrated) or the like by an administrator or the like.

FIG. 9 is a diagram illustrating an example of a detection target table according to the second example embodiment. In the detection target table of FIG. 9, "not use" is set to the deterioration detection target related to the road surface condition of which the reliability is "low" in the reliability table of FIG. 6. When the detected road surface condition is, for example, "very wet", "accumulated snow", "freeze", "manhole", or "joint", the deterioration detection unit 23 excludes the image of the sensor information including the traveling sound used to detect the road surface condition from the road deterioration detection target. When the detected road surface condition is, for example, "snow", "freeze", "manhole", or "joint", the deterioration detection unit 23 excludes, from the road deterioration detection target, the acceleration of the sensor information including the traveling sound used to detect the road surface condition.

In the detection target table, a road surface condition in which the deterioration detection target related to "not use" is also referred to as a second condition.

FIG. 10 is a diagram illustrating an example of a discrimination result of a road deterioration detection target according to the second example embodiment. The example of FIG. 10 indicates that an image represented in bold is excluded from a road deterioration detection target. For example, the road surface condition detection unit 24 detects the road surface condition as illustrated in FIG. 10 with respect to the sensor information in FIG. 3. Then, using the detection target table of FIG. 9, the deterioration detection unit 23 determines the image and acceleration to be excluded from the detection target as illustrated in FIG. 10. More specifically, since the road surface condition is detected to be "very wet" at the dates and times "T0201" and "T0202", the deterioration detection unit 23 excludes the images "P0201" and "P0202" in bold letters from road deterioration detection targets.

In each piece of sensor information, the deterioration detection unit 23 detects road deterioration based on at least one of an image and acceleration which are set as road deterioration detection targets in step S23 (step S24). For example, in FIG. 10, the deterioration detection unit 23 detects the road deterioration based on the image and the acceleration which are set as road deterioration detection target.

The reliability determination unit 25 determines reliability of a detection result of road deterioration based on each piece of sensor information according to the road surface condition detected in step S22 (step S25).

FIG. 11 is a diagram illustrating an example of deterioration information according to the second example embodiment. For example, the reliability determination unit 25 determines the reliability as illustrated in FIG. 11 using the reliability table of FIG. 6. In the example of FIG. 11, at the dates and times "T0201" and "T0202", "cracking rate" and "rutting amount", which are indexes of road deterioration based on an image excluded from the road deterioration detection target, are not calculated. The "MCI value", which is a deterioration index obtained by integrating the road deterioration index based on the image and the road deterioration index based on the acceleration, is not calculated.

Figure 12:
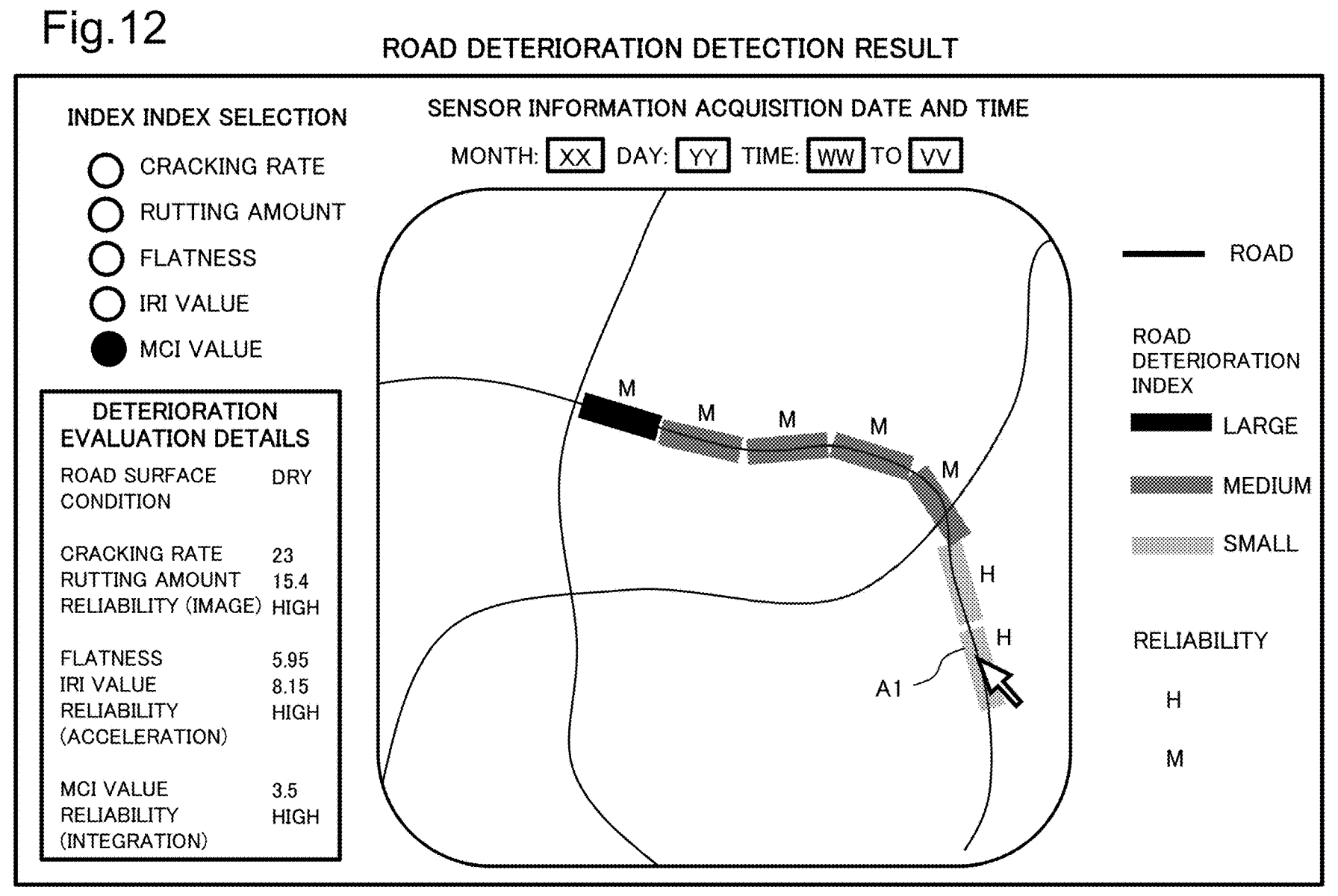

The display control unit 27 causes, for example, the display device to display the deterioration information in a predetermined display mode (step S15). FIG. 12 is a diagram illustrating an example of display of deterioration information according to the second example embodiment. In the example of FIG. 12, unlike the example of the display of the deterioration information according to the first example embodiment illustrated in FIG. 7, detection of road deterioration with the reliability "low" is excluded in advance, and thus two types of reliability "H" and "M" are displayed.

With the above configuration, the operation according to the second example embodiment is completed.

Effects of Second Example Embodiment

According to the second example embodiment, the road deterioration detection based on an image and acceleration can be efficiently executed. The reason is that when a particular condition is detected as a road surface condition, the deterioration detection unit 23 excludes, from a road deterioration detection target, at least one of the image and acceleration acquired together with a sound in which the predetermined condition is detected. With this configuration, the image or acceleration that can obtain only a road deterioration detection result with low reliability can be excluded in advance from the detection target, and the detection process is made efficient.

Third Example Embodiment

A third example embodiment will be described.

Figure 13:
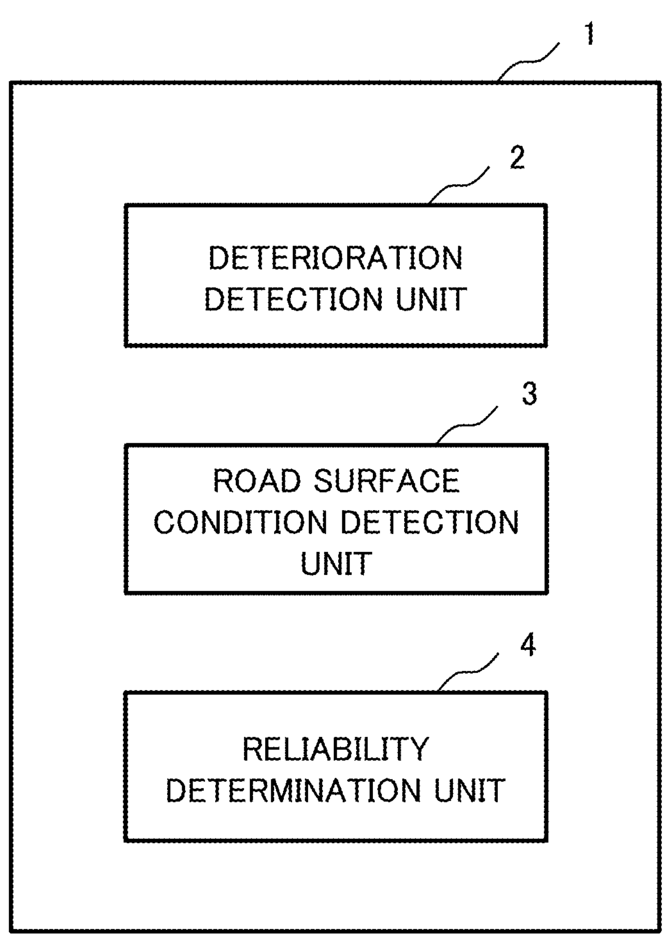
FIG. 13 is a block diagram illustrating an example of a configuration of a road deterioration diagnosing device 1 according to a third example embodiment.

FIG. 13 is a block diagram illustrating an example of a configuration of a road deterioration diagnosing device 1 according to the third example embodiment. Referring to FIG. 13, the road deterioration diagnosing device 1 includes a deterioration detection unit 2, a road surface condition detection unit 3, and a reliability determination unit 4. The deterioration detection unit 2, the road surface condition detection unit 3, and the reliability determination unit 4 are embodiments of a deterioration detection means, a road surface condition detection means, and a reliability determination means, respectively.

The deterioration detection unit 2 detects road deterioration based on at least one of an image and acceleration acquired by a moving body. The road surface condition detection unit 3 detects, based on a sound acquired together with at least one of the image and acceleration used for detecting the road deterioration, a road surface condition at the time of acquiring the sound. The reliability determination unit 4 acquires the reliability of the detection result of the road deterioration based on the detected road surface condition.

Next, effects of the third example embodiment will be described.

According to the third example embodiment, reliability of detection results can be provided in road deterioration detection using an image or acceleration. This is because the deterioration detection unit 2 detects the road deterioration based on at least one of the image and the acceleration acquired by the moving body, the road surface condition detection unit 3 detects the road surface condition at the time of acquisition of the sound based on the sound acquired together with at least one of the image and the acceleration used to detect the road deterioration, and the reliability determination unit 4 determines the reliability of the detection result of the road deterioration based on the detected road surface condition.

(Hardware Configuration)

In each of the above-described embodiments, each component of the road deterioration diagnosing devices 1 and 20 represents a block of functional units. Some or all of the components of each device may be enabled by an arbitrary combination of a computer 500 and a program. This program may be recorded in a non-volatile recording medium. The non-volatile recording medium is, for example, a compact disc read only memory (CD-ROM), a digital versatile disc (DVD), a solid state drive (SSD), or the like.

Figure 14:
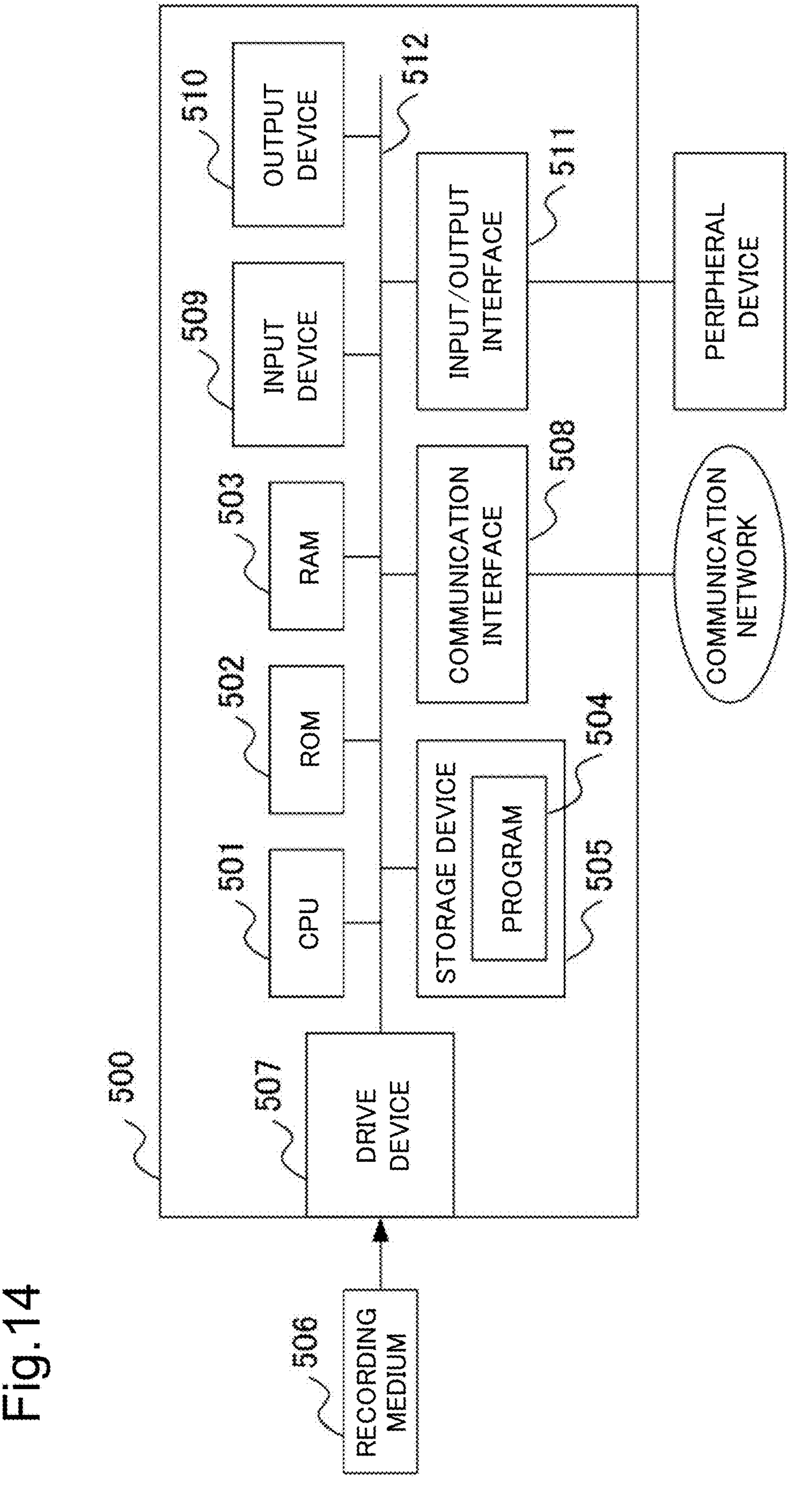
FIG. 14 is a block diagram illustrating an example of a hardware configuration of a computer 500.

FIG. 14 is a block diagram illustrating an example of a hardware configuration of the computer 500. Referring to FIG. 14, the computer 500 includes, for example, a central processing unit (CPU) 501, a read only memory (ROM) 502, a random access memory (RAM) 503, a program 504, a storage device 505, a drive device 507, a communication interface 508, an input device 509, an output device 510, an input/output interface 511, and a bus 512.

The program 504 includes an instruction for enabling each function of each device. The program 504 is stored in advance in the ROM 502, the RAM 503, and the storage device 505. The CPU 501 enables each function of each device by executing instructions included in the program 504. For example, the CPU 501 of each of the road deterioration diagnosing device 1 and 20 executes a command included in the program 504 to implement the functions of the sensor information acquisition unit 21, the deterioration detection unit 23, the road surface condition detection unit 24, the reliability determination unit 25, and the display control unit 27. Furthermore, the RAM 503 may store data to be processed in each function of each device. For example, the RAMs 503 of the road deterioration diagnosing devices 1 and 20 may store data (sensor information and deterioration information) and the like of the sensor information storage unit 22 and the deterioration information storage unit 26.

The drive device 507 reads and writes data in the recording medium 506. The communication interface 508 provides an interface with a communication network. The input device 509 is, for example, a mouse, a keyboard, or the like, and receives an input of information from an operator or the like. The output device 510 is, for example, a display, and outputs (displays) information to an operator or the like. The input/output interface 511 provides an interface with a peripheral device. The bus 512 connects the respective components of the hardware. The program 504 may be supplied to the CPU 501 via a communication network, or may be stored in the recording medium 506 in advance, read by the drive device 507, and supplied to the CPU 501.

The hardware configuration illustrated in FIG. 14 is an example, and other components may be added or some components may not be included.

There are various modifications of the implementation method of each device. For example, each device may be achieved by an arbitrary combination of a computer and a program different for each component. A plurality of components included in each device may be achieved by an arbitrary combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Some or all of the components of each device may be achieved by a combination of the above-described circuit or the like and a program.

In a case where some or all of the components of each device is achieved by a plurality of computers, circuits, and the like, the plurality of computers, circuits, and the like may be arranged in a centralized manner or in a distributed manner.

While the present disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims. The configurations in the respective embodiments can be combined with each other without departing from the scope of the present disclosure.

REFERENCE SIGNS LIST

1, 20 road deterioration diagnosing device
2, 23 deterioration detection unit
3, 24 road surface condition detection unit
4, 25 reliability determination unit
10 road deterioration diagnosing system
21 sensor information acquisition unit
22 sensor information storage unit
26 deterioration information storage unit
27 display control unit
500 computer
501 CPU
502 ROM

503 RAM
504 program
505 storage device
506 recording medium
507 drive device
508 communication interface
509 input device
510 output device
511 input/output interface
512 bus

The invention claimed is:

1. A road deterioration diagnosing device comprising:

at least one memory storing instructions; and at least one processor configured to access the at least one memory and execute instructions to:

store a reliability table in a storage, the reliability table indicating a relationship between a road surface condition and reliability of a road deterioration detection result under the road surface condition;

from a moving body, receive sensor information including an image of a road, acceleration, and a sound, the sensor information being acquired by sensors loaded in the moving body during travel of the moving body:

detect road deterioration based on at least one of the image and the acceleration included in the received sensor information;

detect, based on the sound acquired together with at least one of the image and the acceleration used in the road deterioration detection, a road surface condition at the time when the sound is acquired by learning in advance characteristic frequency and sound pressure of traveling sound caused by differences in the road surface condition;

determine reliability of the road deterioration detection result based on the detected road surface condition and the reliability table;

transmit the road deterioration detection result and the reliability to a display device; and cause the display device to display the road deterioration detection result in a display mode corresponding to the reliability.

2. The road deterioration diagnosing device according to claim 1, wherein the reliability table includes first relationship information indicating a relationship between a road surface condition and reliability of a road deterioration detection result detected from the image under the road surface condition, and second relationship information indicating a relationship between a road surface condition and reliability of a road deterioration detection result detected from the acceleration under the road surface condition; and the at least one processor is further configured to execute the instructions to:

determine reliability of the road deterioration detection result based on the first relationship information, in a case where the road deterioration is detected based on the image; and determine reliability of the road deterioration detection result based on the second relationship information, in a case where the road deterioration is detected based on the acceleration.

3. The road deterioration diagnosing device according to claim 2, wherein the at least one processor is further configured to execute instructions to:

calculate an integrated index of the road deterioration from first road deterioration and second road deterioration, wherein the first deterioration is detected based on the image, and the second road deterioration is detected based on the acceleration; and determine reliability of the integrated index based on first reliability of the road deterioration detection result and second reliability of the road deterioration detection result, wherein first reliability of the road deterioration detection result is determined based on the first relationship information, and second reliability of the road deterioration detection result is determined based on the second relationship information.

4. The road deterioration diagnosing device according to claim 1, wherein the at least one processor is further configured to execute instructions to:

display, in a superimposed manner on a map representing a road on which the moving body has traveled, information indicating the detected road deterioration and information indicating the determined reliability of the detection result of the road deterioration.

5. The road deterioration diagnosing device according to claim 1, wherein the road surface condition is a condition including one or more of water wetting, snow, freeze, a manhole, and a joint.

6. The road deterioration diagnosing device according to claim 5, wherein the at least one processor is further configured to execute instructions to:

lower the reliability of the detection result of the road deterioration in a case where the road surface condition is detected, as compared to in a case where the road surface condition is not detected.

7. The road deterioration diagnosing device according to claim 5, wherein the at least one processor is further configured to execute instructions to:

exclude, from detection targets for the road deterioration, the image or the acceleration acquired together with the sound in a case where the road surface condition is detected.

8. The road deterioration diagnosing device according to claim 1, further comprising:

a storage that stores the reliability table.

9. The road deterioration diagnosing device according to claim 1, wherein the road deterioration based on the image is detected by an image analysis by AI.

10. The road deterioration diagnosing device according to claim 1, wherein the image is captured by a camera provided in the moving body, the acceleration is measured by a sensor provided in the moving body, and the sound is measured by a microphone provided in the moving body.

11. A road deterioration diagnosing method comprising:

storing a reliability table in a storage, the reliability table indicating a relationship between a road surface condition and reliability of a road deterioration detection result under the road surface condition;

from a moving body, receiving sensor information including an image of a road, acceleration, and a sound, the sensor information being acquired by sensors loaded in the moving body during travel of the moving body:

detecting road deterioration based on at least one of the image and the acceleration included in the received sensor information;

detecting, based on the sound acquired together with at least one of the image and the acceleration used in the road deterioration detection, a road surface condition at the time when the sound is acquired by learning in advance characteristic frequency and sound pressure of traveling sound caused by differences in the road surface condition;

determining reliability of the road deterioration detection result based on the detected road surface condition and the reliability table;

transmitting the road deterioration detection result and the reliability to a display device; and causing the display device to display the road deterioration detection result in a display mode corresponding to the reliability.

12. A non-transitory recording medium storing a program that causes a computer to perform processing comprising:

storing a reliability table in a storage, the reliability table indicating a relationship between a road surface condition and reliability of a road deterioration detection result under the road surface condition;

from a moving body, receiving sensor information including an image of a road, acceleration, and a sound, the sensor information being acquired by sensors loaded in the moving body during travel of the moving body;

detecting road deterioration based on at least one of the image and the acceleration included in the received sensor information;

detecting, based on the sound acquired together with at least one of the image and the acceleration used in the road deterioration detection, a road surface condition at the time when the sound is acquired by learning in advance characteristic frequency and sound pressure of traveling sound caused by differences in the road surface condition;

determining reliability of the road deterioration detection result based on the detected road surface condition and the reliability table;

transmitting the road deterioration detection result and the reliability to a display device; and causing the display device to display the road deterioration detection result in a display mode corresponding to the reliability.

* * * * *